United States Patent [19]
Ferris

[11] Patent Number: 5,344,326
[45] Date of Patent: Sep. 6, 1994

[54] TEACHING METHOD AND SYSTEM

[75] Inventor: Maxime Ferris, Waterloo, Canada

[73] Assignee: Audio-Visual Publishers Inc., Hackensack, N.J.

[21] Appl. No.: 898,276

[22] Filed: Jun. 15, 1992

[51] Int. Cl.⁵ .............................................. G09B 7/00
[52] U.S. Cl. ...................... 434/336; 434/327; 434/350; 434/362; 273/429; 364/419.2
[58] Field of Search .............. 434/118, 156, 157, 16 P, 434/185, 201, 307, 308, 322, 323, 327, 336, 350, 362, 365; 273/429-431, 433, 434; 364/410, 419, 419.1, 419.2; 395/927; 358/85; 348/14

[56] References Cited

U.S. PATENT DOCUMENTS

| | | | |
|---|---|---|---|
| 3,245,157 | 4/1966 | Laviana | 434/336 X |
| 3,328,803 | 6/1967 | Schwerin | 434/350 X |
| 3,461,571 | 8/1969 | Luxton | 434/336 |
| 3,624,929 | 12/1971 | Swanson et al. | 434/336 |
| 3,882,538 | 5/1975 | Lowe | 434/307 X |
| 4,346,442 | 8/1982 | Musmanno | . |
| 4,625,244 | 11/1986 | Chong et al. | 434/350 X |
| 4,651,299 | 3/1978 | Miyazaki et al. | 434/350 X |
| 4,764,120 | 8/1988 | Griffin et al. | 434/350 x |
| 4,767,335 | 8/1988 | Curt | 434/350 X |
| 4,820,167 | 4/1989 | Nobles et al. | 434/336 |
| 4,877,408 | 10/1989 | Hartsfield | 434/350 |
| 5,002,491 | 3/1991 | Abrahamson et al. | 434/336 X |
| 5,011,414 | 4/1991 | Yoshizawa et al. | 434/336 X |

FOREIGN PATENT DOCUMENTS

| | | |
|---|---|---|
| 0751605 | 1/1967 | Canada . |
| 1066048 | 11/1979 | Canada . |
| 1192394 | 8/1985 | Canada . |
| 1215473 | 12/1986 | Canada . |

*Primary Examiner*—Richard J. Apley
*Assistant Examiner*—Joe H. Cheng
*Attorney, Agent, or Firm*—Jeffrey T. Imai; Arne I. Fors; D. Doak Horne

[57] ABSTRACT

There is disclosed an affordable method and system of fully automating the instruction of a plurality of students which incorporates the use of a single CPU in conjunction with student questioning, responding and information feedback devices and which no longer relies upon the ability, mindset or even presence of a classroom teacher. The method further includes a fully-automated directly-integrated marks, records, reports and lesson management system.

8 Claims, 3 Drawing Sheets

TEACHING METHOD AND SYSTEM

FIELD OF THE INVENTION

The present invention relates to a system and method of automated teaching and management. More particularly, the invention relates to an affordable system and method of teaching a plurality of students incorporating the use of a single classroom computer to improve the learning performance of all students by automatically and better controlling the content and teaching of lessons and by automatically managing their marks and records to better evaluate the performance of individual students—and without the need for the highly skilled classroom teacher, or even a certified teacher.

BACKGROUND OF THE INVENTION

Teaching methods have been developed over time attempting to improve the learning performance of students. Such methods have taken many forms including providing various incentives to students for academic improvement.

Further forms of teaching aids have been developed, for example, journals, teaching systems and methods, and teaching machines.

Prior to the use of computers, means have been provided for instructions to simultaneously ascertain the responses of a plurality of students having an objective question posed to them. An example of such a teaching means includes an instructor console electrically connected to a plurality of student consoles. Each student console includes a plurality of response buttons. In use, the instructor reads or displays questions to the students, who then push the button corresponding to the correct answer. The instructor's console preferably includes a meter to indicate the percentage of correct responses and a printing device which indicates the individual student's correct and incorrect responses. Such a device, by providing the teacher with student responding information, helps the teacher teach, but it does nothing to help students learn.

Since the advent of computer technology, the use of computer based teaching has been incorporated into learning institutions. Computer based teaching is concerned with the general use of computers and computer lessons to teach all academic subjects in regular teaching environments, utilizing a configuration where each student in the class has his or her own computer and lesson software. This method of teaching is intended to improve the overall teaching performance of all students in any academic subject at any level. The use of computer technology in teaching requires the active participation and support of both the instructors and the students. However, the need to supply each student with his or her own computer and software plus administrative, wiring service, vandalism and teacher training problems create such high costs and administrative difficulties as to render such use of computers in classrooms virtually impossible. Furthermore, there are questions as to whether this type of computer use actually improves—or improves upon—conventional teaching methods.

Several applications to teaching employing electronic teaching aids are known in the art. The inventor herein has, for example, shown in U.S. Pat. 3,497,968 a teaching machine having a central console in which there are connected therewith an instructor's switch and a plurality of student switches. Generally, with such an apparatus, the instructor questions the class and the class members are required to respond within a certain period of time. Subsequent to this period, the instructor actuates a button causing paper in a printing mechanism to advance. Upon release of the button a tone sounds indicating to the students that a response is required.

Further, in Canadian Patent 751,605 there is disclosed a digital computer teaching machine. This device is particularly useful for teaching a student the fundamental steps of computer programming. However, the required configuration is one student-one machine, rendering its use dubious and impossible for general class use because of costs.

In Canadian Patent 1,066,048, an audio-visual teaching machine is disclosed. The device provides an operator's console, an educational information unit, a student performance unit, an audio visual display unit, a student's response registering unit as well as a host of other components. The invention is particularly concerned with the progress of a student based on monitoring his or her biological processes. Here again, the required configuration is one student-one machine which is undesirable.

Further, in Canadian Patent 1,192,394 there is provided a teaching and entertainment device having a speaker assembly, a multisegment CRT, a keyboard and other ancillary equipment. Again, the required configuration is one student-one machine.

Although these devices and methods have some use, they not only all have inherent limitations, but they seldom address the really crucial teaching problems properly, if at all. In most instances, these teaching problems are the result of the constraints imposed by "mass education" in its attempts to make education affordable for all. However, innovations, such as the devices and methods described above come and go, unable to prove any significant benefits.

They fail to address the effect on education of urban blight, population shifts and lack of funding which have resulted in over-crowded classrooms, severe discipline problems and a rising dropout rate. The diversity of student abilities within any one classroom, means that classes must be taught at the pace which suits the slowest students, frustrating and often boring the remainder of the class. Cutting down on the sizes of the classes raises the cost per student. "Tracking", the process of separating students by general ability and putting those of one general ability in its own classroom, is socially repugnant to those who may be thus stigmatized as "slow" or "poor" learners. Student and parent resentment has caused there to be less and less recourse to tracking—and so the problem persists.

These devices and methods have failed to address the fact that it has been well established that students are endowed with different amounts and kinds of intelligence. But no one has yet devised a method for measuring the optimal learning potential of an individual student for a particular subject except in terms of comparing the performances of two or more students who are given the same task—hardly a valid method for determining what an individual student is really capable of learning given the most efficient teaching and learning techniques and materials.

These devices and methods have failed to properly address the fact that too many students either do not wish to learn or cannot and the competition for the students' time from recreational and entertainment activities is increasing. Students spend an inordinate amount of time watching entertainment TV and drugs, alcohol and teen-pregnancies exacerbate the general situation.

These devices and methods do not help teachers to successfully compete for their students' time and interests with entertainment TV and such. These provide students with a high degree of pleasure motivation, the powerful combination of learning and game feedback and often embellished with bells and whistles, music, noise, flashing lights and the usual commercial hoopla. As a result, many students do not do their homework or do it badly and come to school ill-prepared to take the lessons, forcing teachers to regurgitate the subject matter of the homework, wasting valuable teaching time.

They have failed to properly address the needs of students who fall into the extremes, the very poor and the very bright students. Except for students with learning disabilities and the Special Ed classes for their particular needs, conventional systems are forced to ignore them and concentrate their resources on the "average" student. These devices and methods have no answer for the majority of students who, for whatever reasons, wish to learn but cannot, if not with respect to all subjects, then with respect to specific subjects. Even the basic skills are suffering; reading and arithmetic scores remain low or are getting lower and the general reading problem continues to worsen.

These devices and methods do not address the extremely critical problem which results from the fact that 100% teacher interaction with ALL students in a classroom is presently impossible. Traditionally, teachers either lecture or address questions to the entire class or to individual students. In either case, only one student is necessarily interacting with the teacher (is induced to concentrate) since only one student is required to respond. The remainder of the class are interacting only partially, or not at all if they are daydreaming. And if teachers simply lecture, the amount of class interaction and consequent concentration is problematical and likely to be low. Yet, teachers require 100% interaction from all their students to be able to teach them all effectively.

Part of the same problem is the difficulty teachers have initiating the learning process for all their students because of the lack of 100% interaction. They are unable to effectively employ questions for that purpose. Without the initial interaction (and induced concentration) of every student, teachers cannot properly initiate the learning cycle (motivation, leading to concentration, leading to learning, leading to motivation) for every student in the class, losing for some or all students the ability to experience the pleasure motivation of the initial learning that starts the learning cycle and perpetuates it. And this failure affects most adversely those students who are slow learners.

And these devices and methods have consistently failed to address a related major teaching problem, the fact that teachers have absolutely no way to introduce game-pleasure motivation, possibly the strongest type of motivation of all. Which is to be deplored since other attempts by teachers to motivate their students are too often unsuccessful, counter-productive or impossible. There is no argument that teachers can use that will convince students that essential but tedious rote-drills are fun.

The inability to initiate or to perpetuate the learning cycle for all students for long enough to complete essential learning tasks, leaves teachers wide open to serious discipline problems. Students who cannot learn become bored, are prone to mischief and disrupt the teaching and the ability of other students to learn, encouraging dropout tendencies.

These devices and methods fail to address the problems of student cheating or of the "cramming syndrome" where virtually all studying is done by students just prior to tests and examinations—and quickly forgotten for lack of reinforcement. Such test and examinations are not even a valid indication of student ability because of the stress and memory blocks engendered in their taking. Moreover, such testing is counter-productive with respect to valid learning. Teachers cannot provide learning feedback instantaneously following student responses resulting in both correct and incorrect responses being reinforced. To supply the feedback would provide valid learning but teachers would have to sacrifice valid marks; students would simply change their incorrect answers.

These devices and methods do not address the problem of wasted teaching time. The current daily process of asking questions and waiting for responses and re-asking the same questions when responses are incorrect, becomes a slow and tedious one forcing many teachers to virtually "fly" through the last part of the course without being able to give adequate attention to the quantity or quality of student learning.

History teachers may barely cover the factual information requirements of the course and will have practically no time for discussions that would enable their students to understand the significance of the information. And it is the same for all teachers and all subjects. Time is the bane of teaching; there is never enough but conventional teaching has a built-in waste factor that teachers have difficulty controlling and innovations up to now have consistently failed to consider.

They have totally failed to address the problem of the absentee teacher. It is a constant annoyance and problem, particularly when the absenteeism is unexpected, which is often the case. The absentee must be replaced by a substitute teacher who in most cases becomes little more than a monitor. A substitute teacher lesson is more often than not, a lost lesson.

Nor do these devices and methods address the fact that teachers have no way of properly encouraging a class discussion nor of resolving the issues. With conventional class discussions, most students are discouraged from participating. Too often they are monopolized by a few bright students or they become dialogues between one or two students and the teacher. Nor do teachers have any way to resolve issues properly since no quick efficient secret-ballot voting technique is available to them, only an "intimidating" show of hands.

Nor do they properly address the problem of cooperative small group learning. Teachers have no means for guaranteeing that group members on their own will be able to properly control their discussions or other learning activities.

Nor do these devices and methods properly address a major defect of conventional teaching which is the virtual total lack of teaching feedback that is required to enable teachers to constantly assess the effectiveness of their efforts. The inability on the part of teachers to determine if the class properly understood an explanation of a particular concept may lead them to continue on to a next dependent concept and possibly with disastrous results. This teaching failure is probably the most significant single cause of student dropouts.

Additionally, they do not address the fact that teachers have no valid way, on a day-by-day basis, of timely assessing whether individual students are developing dropout tendencies or their classes generally are making progress or remaining static or dropping behind.

Finally, these devices and methods are completely unable to address the most difficult educational problem of all to resolve, the problem of incompetent teachers. What proportion of teachers fall into this category will never be known since real teaching accountability is virtually impossible given all the variables. The occasional classroom visits by assistant principals and examination results may identify the worst cases but poor teaching remains endemic and the major factor that adversely affects the ability of students to learn.

In short, none of the devices and methods developed to date have addressed the problems described above. Or if they have, obviously not very successfully. Certainly, the prevalence of austerity budgets throughout the nation attests to the thinking of the general public with respect to the general education situation on the elementary and secondary school levels. The voting of minimal local funding sends a clear message. Taxpayers are unwilling to throw money at what they perceive to be a failing system.

ATTEMPTS AT RECTIFICATION, USING COMPUTERS

Recently, means have been devised to rectify some of the problems described above with the use of computers.

Using computers to teach academic subjects should not be confused with the use of computers to teach "computer literacy" (word-processing, programming, etc.), an aspect of computer use which addresses a totally different area from that with which we are here concerned. Suffice it to say that there is nothing wrong with how computer literacy is taught, any more or less than with how any other academic subject is taught. However, what we are dealing with here is the use of computers to teach academic subjects—the concept referred to in the educational community as "computers in education"—and not with computer literacy.

The present use of "computers in education" is fatally flawed because of its incorporation of individualized instruction, a concept which, for a school, is both pedagogically impractical and economically unfeasible. It means one student, one computer. Brought to its logical conclusion, the hardware and software costs (a computer and program for every student) would become astronomical. It would be economically prohibitive and theft, vandalism and service would become an administrative nightmare.

Much worse—even if school systems could afford the cost—is the fact that except for individual remedial or enrichment studies, the past use of teaching machines and programmed texts, or any form of individualized instruction has proven to be totally impractical for classroom teaching, even before there ever were computers. The simple fact is that in spite of the many millions spent on computers in education, there is not a single instance of proof that individualized computer instruction as a general teaching method can do any better or even as well as conventional teaching. Consequently, it is neither justified nor very often employed.

Other alternative uses of computers, CAI (Computer Assisted Instruction) has been around for many years and TI, a computer networking system, has also been available for some time but neither, or other similar developments, have caught on. They too depend upon individualizing with its attendant pedagogic imperfections and between that and their high cost, it is unlikely, as they are presently constituted, that they will ever have any great impact on education generally.

However, there is a very confused perception that since computers are much in evidence in all schools today that therefore, they must be worthwhile for teaching academic subjects. They are necessary for teaching computer literacy—which is their purpose but—not for teaching academic subjects. Further, in the case of available educational software, the need to transfer student marks from the commercial programs to the teachers' management programs is a tedious task, assuming that teachers have both a management program and a computer available, seldom the case. Teachers can make little use of commercial software—and do not.

In short, the present use of "computers in education" resolves not a single problem faced by administrators, teachers or students. On the contrary, it exacerbates them. As presently constituted it is a doomed concept in a state of stagnation.

The reality of the situation is that we are stuck with schools and classrooms and all the educational problems described above—at least for the foreseeable future. The present invention offers a viable solution, an efficient totally-automated conventional teaching system, one that will enable master teachers (subject matter specialists) to continually update and improve its lesson contents and strategies or alternatively, a manually-operated spontaneous conventional teaching system that master teachers can employ to supplement their present efforts.

And when master teachers are not available, for whatever reason, administrators will be able to employ classroom monitors who will be capable of operating the system and implementing the method to achieve the same results as would any master teacher, optimal learning for all students within the capabilities of each to do so.

The present invention incorporates, for the first time, such features that enable it to address and properly resolve every teaching, learning and administrative problem described above. This includes a unique "recognition questioning" method operating in conjunction with a single button responding device (or, if preferred, a multiple button responding device) which, combined, renders practical every conceivable form of classroom question and response. Further, the method and system of the present invention make possible simultaneous mandatory class responding to the same questions and provides both instantaneous learning—and learning motivation—and game feedback motivation, which creates a tremendous motivational force that has never before been achieved.

As a result, 100% interaction with the lessons by ALL students in the class is assured leading in turn to guaranteed learning for ALL students because of the instantaneous confirmation or correction feedback. Every student in the class is able to achieve the "short-term-goal" learning cycle that each question and class response initiates. The tremendous pleasure-motivation force of combined learning and game feedback, or its anticipation, induces a high degree and duration of concentration, enabling learning to take place easily and quickly, again generating learning and game pleasure motivation which, in turn again induces concentration— —and so on until the learning task is completed.

Generally, the system and method of the present invention comprises a single modified CPU and a unique sequence of steps operating in conjunction with ancillary hardware and software. With the system of the present invention, a master teacher or a classroom monitor is capable of executing lesson material in every conceivable manner with the addition of a great variety of teaching and learning techniques. Accordingly, the results of individual student responses may be fed directly into the CPU which then saves, stores and manipulates the results of those responses to provide a variety of records including individual period records and final student reports.

Of vital significance to the practical aspects of the present invention is that only one computer is required for a class of up to fifty students and more. With the addition of relatively inexpensive ancillary hardware and software, it enables the teacher to achieve 100% interaction with every single student in the class which, like single-button responding and dual learning and game feedback motivation, has never been achieved before. The combined cost of computer and ancillary hardware and software brings the total cost per classroom of up to fifty students to that of about two computers, well within the financial means of any school.

SUMMARY OF THE INVENTION

With the present invention there is provided a manually-operated system or a totally automated system of teaching and management and lesson preparation, for a class of any size, which requires no classroom teachers in the traditional sense and can be put in place and operated solely by the administrative staff and department heads aided only by adult class monitors plus the controller, remote input, transmitting and response means herein described, and specialized computer software which can be prepared by those skilled in the art and having:

COURSEWARE PRODUCTION MEANS
  means for assembling, timing and coding on computer disks (for automatic operation) "libraries" of subject matter items for specific academic subjects covering a year's work. A library for a single academic subject for a year's work might comprise from ten to thirty thousand individually coded items of every type such as data, test affirmative negative and opinion questions, corrections, rationales, expositions, demonstrations and simulations and composed of every manner of audios and of visuals, such as printing, graphics, colour and motion.
  means for creating dual-purpose (DP) questions, i.e. they may be used either as affirmative questions (questions requiring a yes, true or agree answer to be correct) or as negative questions (questions requiring a no, false or disagree answer to be correct) to be followed by the correction statement.
  means for developing exact "tailored-to-exact-teacher-requirements" courseware broken down to the actual lessons for a school term, by the automatic selecting and organizing of specific items from an academic subject "library" of coded items.
  means for adding, deleting, modifying and coding items for individual courseware lessons.
  means for printing out lessons with different sets of DP's to be used specifically for remedial or enrichment study.

INITIALIZING MEANS
  means for creating class information screens.
  means for creating student names list screens.

AUXILIARY LESSON OPERATION MEANS
  means for pre-lesson equipment checkout
  means for creating lesson response records
  means for selecting and identifying students for cooperative small-group learning or panels.

GENERAL LESSON OPERATION MEANS
  means for simulating all teacher manually-activated functions described above which are part of the remote input means 22 and incorporating them into a fully-automated CPU system which will be triggered by appropriate codes on the computer screen lessons.
  means for retrieving (and storing) computer lessons.
  means for retrieving (and storing) option screens.
  means for instant selection of a different set of DP questions for a lesson (students may practice with one set of DP's for a lesson while the lesson questioning is conducted with a different set of DP's for the same lesson).
  means for indicating the time remaining before a lesson must end, using a digital clock display at the bottom of each screen.
  means for operating a lesson in manual or automatic mode and if the latter, then permitting the lesson to be run at any reasonable percentage of the original rate of speed set by the lesson's author.
  means for permitting or denying students a review of the subject matter, prior to questioning, and if permitted, then allowing the option of sequential or scrambled presentation of the subject matter.
  means for permitting or denying the testing of students by questions on the subject matter, and if permitted, then allowing the option of sequential or scrambled presentation of the questions.
  means for permitting or denying the repetition of question items to which incorrect response were made and if permitted then having means for determining what percentage of a plurality of responses must be wrong to warrant repetition and how many times the same incorrect responses will be repeated.
  means for permitting or denying "memory improvement" and if permitted then having means for determining how many subject matter item will be reviewed and then tested on, at any one time.
  means for providing a par score against which an individual or class score can be compared and which par score shall be a set percentage of the highest possible score attainable for a particular lesson.
  means for providing a par time for completing a lesson against which an individual or class time can be compared and which par time shall be a set percentage of the lesson running time as provided by the lesson's author.
  means for displaying an individual or class scoreboard following the taking of each lesson, which scoreboard displays all pertinent information with respect to how the individual or class performed in taking the lesson, including the final score.

means for displaying running scores at the bottom of each screen where a running score at the bottom of any screen represents the final score of the individual or class if the lesson were to end with that screen.

means for displaying both confirmation or correction and consensus visual feedback instantaneously after each response to a question and means for controlling duration of the feedback.

means for providing or denying both confirmation or correction and "how the majority voted" audio feedback instantaneously after each response to a question.

means for permitting or denying a lockout number and if permitted, allowing for the setting of a lockout number (responding time automatically ends when affirmative responses reach the lockout number and those who had not responded affirmatively are automatically considered as having responded negatively, whether that was their intention or not).

DISCUSSION MEANS means for permitting the maximum time that discussions will be allowed to go on for the lesson.

means for setting the number of discussion screens that will be covered during the lesson.

means for setting the average screen discussion time (Program fills this in automatically by dividing "Total of screens to discuss" into "Total of all discussion times").

means for setting a specific discussion time for individual discussion screens (some discussions are more important than others and time allowed for each varies accordingly).

means for permitting or denying Talking Order Constraints and if permitted then allowing students to speak in the order in which they indicate their desire to do so or alternatively, allowing students who have spoken the least to speak before those who have spoken more.

means for permitting or denying Talking Time Constraints and if permitted, setting a Maximum Talking Time (for any one time that a student speaks), setting a Countdown Time (flashing number counts down time remaining for student to talk), setting a Time Diminution Function (x minutes and seconds before a particular discussion must end, Maximum Talking Time is reduced to enable as many students as possible to speak).

means for displaying elapsed discussion time for each discussion screen (by means of a digital clock at the bottom of the screen.

means for displaying the actual permitted discussion time for each discussion screen (by means of a digital clock at the bottom of the screen which adds any unused time from previous discussion screens to the originally allowed time).

SCORES AND BONUSES MEANS means for assigning marks for each of four possible responses to information questions without consideration for the proportion of affirmative questions to negative questions posed during the lesson and which questions and responses are, a) correctly calling True an item which is true, b) correctly calling False an item which is false, c) incorrectly calling True an item which is false and e) incorrectly calling False an item which is true.

means for assigning variable marks for responses to information questions based on the proportion of affirmative questions to negative questions posed during the lesson.

means for assigning marks of increasing value to those students who vote with the majority on opinion questions (as the opinion question increases in importance, the assigned mark increases proportionately).

means for assigning bonus marks to those students whose final score for a lesson is greater than the class average.

means for assigning bonus marks to those students whose responding time to affirmative questions posed during a lesson is less than the class average.

means for assigning bonus (or penalty) marks based on a comparison of average self-scores (if self-scoring is used) with Target scores (target scores can be average of computer lesson scores or a special or regular term examination mark).

ANALYSIS MEANS means for determining how the students of two or more classes responded to each of similar questions posed to those classes (providing question NORMS).

means for determining the average student score of two or more classes who responded to similar lesson questions (providing student score NORMS).

means for determining during a school term, the total number of student responses made to date, and the total number of those responses which were correct. By logging and manipulating the two figures so as to arrive at a "percentage of correct responses" it is possible to quickly determine at any time the progress of a class up to a certain date or for any specific period.

means for storing and for retrieving lesson response and analysis records for examination.

STUDENT REPORTS MEANS means for integrating non-computer evaluation marks into the student final reports (marks for self-scores, essays, effort and improvement etc.).

means for integrating teacher's individual and class messages for students and parents, into student reports.

means for viewing/printing interim or final student reports.

means for producing and utilizing viable criteria by which teachers may evaluate interim or final individual student performances by comparison with the class average performance.

According to one object of the present invention, there is provided a teaching system comprising, in combination:

controller means having at least one data file therein, the data file having information associated therewith;

remote input means for accessing the at least one data file, the remote input means being in communication with the controller means;

transmitting means in communication with the controller means for transmitting the information; and remote response means in the communication with the controller means for selectively responding to question information transmitted by the transmitting means.

The controller means may, in one form, comprise a personal or lap top computer having the conventional components i.e. hard drive, disk drive, keyboard, and monitor.

The transmitting means may include both audio and visual information which may be, for example, a suitable device for visual information presentation, i.e. an overhead projector, a computer screen, a student response feed back display etc. Such devices permit all members under instruction to view the information simultaneously. Suitable audio sources may optionally be connected with the visual display e.g. a loudspeaker system etc.

The remote response means is preferably connected to the controller means via a remote control i.e. a radio frequency source, but may also be connected by wire.

Input means is used by an instructor to access existing information of the controller means or to input new information. The input means may comprise a keyboard which is linked to the controlling means. This allows an instructor to question students, access new learning material existing on a disk or in the hard drive of the controlling means etc.

Students are able to answer questions posed to them with individual remote response means which are connected to the controller means. The remote response means comprises a default switch e.g. toggle, button, etc. which provides an affirmative response when triggered or a negative response when not triggered within a predetermined time frame. In addition, the response means may be activated by a timer associated with the controller means. This arrangement establishes a time frame within which a response must be received to a question posed, or no effect will result from either a negative or an affirmative response.

According to another object of the present invention, there is provided a method of teaching comprising the steps of:
- providing a controller means having an information memory associated therewith, the controller means having means for accessing the information memory of the controller means;
- inputting at least one file into the memory of the controller means having subfiles associated therewith for data categorization;
- providing remote student responding means;
- questioning a plurality of students having remote response means;
- effecting a remote response or default answer by the students and feeding the response to the controller means;
- compiling data received from the student responding means; and
- generating a response from compiled data.

In the method and system described, all students in the class, must respond via the use of the responding means to a question posed; the pace is determined by the instructor which may be varied by the instructor to best suit the particular class. Thus, students are encouraged to stay actively involved since they are all required to respond to every question, unlike conventional question and answer techniques where only the one student to whom a question is addressed is required to interact with the teacher since only that one student is required to answer the teacher's question.

The number of positive responses to questions posed to students, as well as the number of negative responses is indicated with the transmitting means and the correct answer is also indicated. In this arrangement, the individual student's response is not displayed to other members of the class. With the use of the present method and system according to the present invention, two distinct advantages result; namely, the freedom of the instructor to gauge individual students' responses as well as their responses collectively to monitor the effectiveness of his or her teaching, while additionally monitoring the ability of students to learn. Further, the student, since he or she is informed by the transmitting means of how many fellow students answer correctly, is able to visualize his or her progress vis-à-vis the standing of fellow students. This consensus feedback provides a game type atmosphere and desire to achieve within.

According to another object of the present invention, there is provided a teaching system that requires a single CPU regardless of the number of students in the class and a sequence of steps in conjunction with remote input means.

Another object of the present invention is to provide a teaching system capable of developing maximum individual student learning potential for particular subjects.

A further object of the present invention is to provide a system of teaching enabling instructors to teach a greater number of students simultaneously without the concomitant difficulty and limitations associated with conventional teaching methods.

Yet another object of the present invention, is to provide a system and method of teaching which enhances the general reading skills and thinking speed of all students based on visual screen lessons.

Yet another object of the present invention is to provide a system and method of teaching in which there is a high degree of student-teacher interaction regardless of the class size.

Having thus generally described the invention, reference will now be made to the accompanying drawings, illustrating preferred embodiments.

DETAILED DESCRIPTION OF THE PREFERRED EMBODIMENTS

Generally, a prescribed method of teaching involves students responding to questions posed by an instructor. However, this method is only minimally useful as a teaching technique since it is maximally effective only for those individual students who are periodically selected to respond.

Only maximal concentration on the subject matter will result in maximal learning of that subject matter. But maximal concentration cannot be self-induced. It can only be generated as the result of a direct personal intellectual challenge, such as a question, that mandates an answer and that challenge will not go away until that answer is forthcoming.

And that answer will not be forthcoming without the highest degree of focused attention, maximal concentration, on the part of the student. It is not self-induced maximal concentration which is easy or difficult to achieve depending on what degree of interest the subject matter has for the student. Rather it is an externally induced maximal concentration that is involved and, in that respect, it is easy for a student to induce it, provided the teacher asks a question.

That is why the question is the most efficient teaching catalyst ever devised.

However, under conventional classroom conditions, only those students who are selected to answer questions are being challenged to provide a correct answer and therefore only those students are able to concentrate maximally on the subject matter of the question and answer.

While an individually selected student who must respond to a question is so doing, the remainder of the students present are not so challenged and are unable to achieve the same degree of concentration on the subject matter than if, like the selected student, they too were required to provide a correct answer.

Such other students present will interact with the teacher's question with varying degrees of interest and attention and therefore of concentration, from none at all, if they are daydreaming or simply not interested, to a degree of concentration which at best is less than that of the selected student. Such a varied degree of student interaction and therefore of total concentration, considering all the students in the class, renders questioning in conventional teaching a dubious exercise and learning extremely ineffective and inefficient.

Applicant, with the present invention, has superseded the selection limitation by devising a system and method in which all students are required to, and are provided with the means to respond to all questions posed by teachers—resulting in complete teacher-student interaction. As such, essentially each and every student is able to generate maximal concentration providing for significantly more effective and efficient learning.

Briefly, the system of the present invention includes four basic components, namely:

a controller means, remote input means, remote response means and transmitting means; audio means are optionally included.

Figure 1:
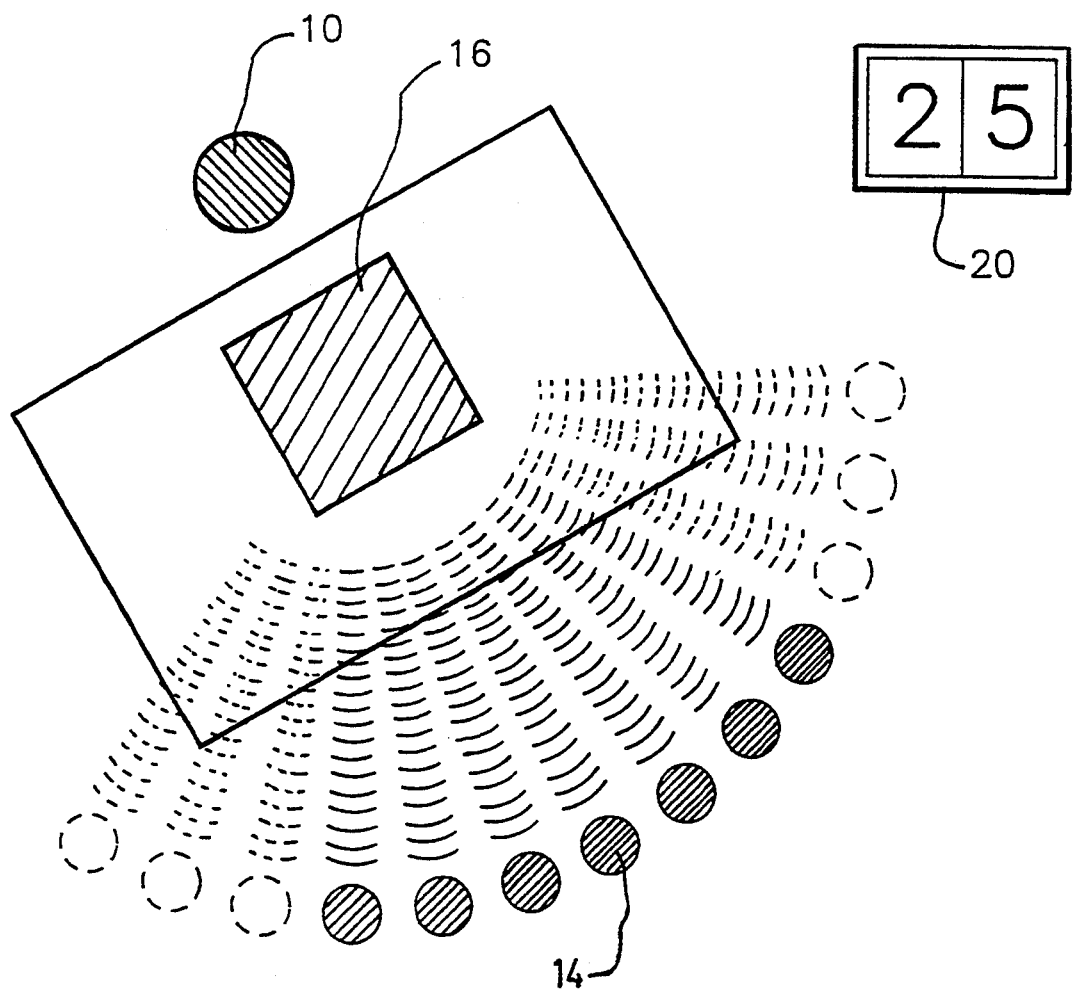
FIG. 1 is a schematic representation of the system of the present invention as employed in a classroom situation.

Referring to FIG. 1, shown is a schematic representation of the system as employed in a classroom. Numeral 10 represents the instructor who poses questions to the entire student body 14. The controller means 16 receives responses from the student responding means 18 shown in FIG. 2. The transmitting means 20, which may be a CRT monitor screen and projector etc. conveys the information to the students 14.

Figure 2:
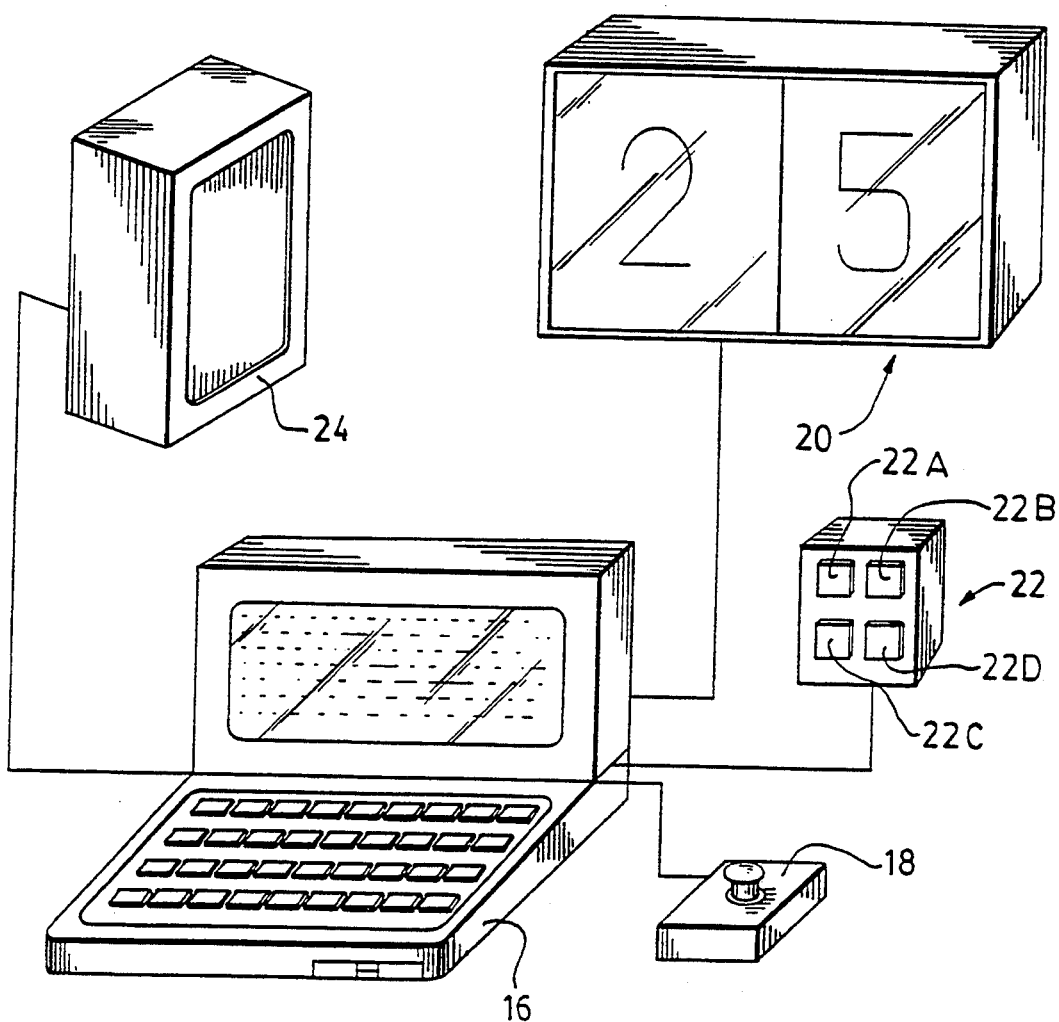
FIG. 2 is a perspective view of the components in the system of the present invention.

In greater detail, with reference to the system of the present invention shown in FIGS. 1 and 2, each student in the body of students 14 in a classroom, receives student response means 18 which is preferably a single button response means 18. The response means 18 is, in one form, radio frequency controlled, the signal of which is received by the controller means 16 hereinafter described. The response means 18 comprises a single button device incorporating either hard-wired means or conventional radio frequency generating circuitry housed in a body. The single button is depressed for an affirmative response during the designated responding period, and to answer negatively, a student does nothing i.e. the response means 18 operates on a default system.

Since the method of teaching involves score tabulation (hereinafter described), all students are required to respond to all questions which must be of the true-false, yes-no, or agree-disagree variety. By employing a single button response means 18, applicant has found that the students do not suffer from stress induced confusion during speed questioning, which is a drawback inherent to multiple button responding devices. Further, the use of radio controlled responding means 18 allows each student the freedom of mobility within the classroom, which contrasts the conventional regimentation in classrooms not employing such means.

Referring now to the controller means 16, typically a personal or lap top computer may be used having the conventional components such as a keyboard, hard drive, disc or diskette drive, ports for ancillary equipment etc.(not shown) In addition, the computer may be modified rendering it preferably capable of receiving radio signals from a plurality of response means 18 simultaneously and from a radio-controlled input means (teacher's remote-control question activator 22). The radio frequency receiving apparatus, known to those skilled in the art, is preferably associated with the program of the controller means 16 for tabulating individual responses of the students 14.

Additional software may also be provided to assist the instructor 10 and the system disclosed herein may be used with an instructor's routine curriculum. Such software may be any suitable program for the desired purpose and can be readily prepared by those skilled in that art. In the event that an instructor wishes to expand the use of the system, further lessons may be established to assist in instruction.

Referring now, in greater detail, to the remote input means 22, the input means 22 preferably comprises a radio controlled hand held instructor keypad. The keypad preferably includes a plurality of colour coded keys 22A, 22B, 22C and 22D thereon which are used by an instructor to indicate to the class of students 14 various data. Each key represents different data including a key for an affirmative response, one for a negative response, a cancel key and a hold key.

In one form, the four keys 22A, 22B, 22C and 22D are coloured green, red, yellow and blue representing an affirmative response, a negative response, a cancel function and a voting or hold key, respectively. The colour coding directly operates with the interactive transmitting means.

For example, when the teacher presses the green affirmative key 22A of the remote input means 22, then, after the students respond, a green decimal point appears on the (left) affirmative side of the display transmitting means 20 following the number of affirmative responses indicated. This indicates that the affirmative response was the correct response. When the teacher presses the red negative key 22B of the remote input means 22, thereafter the students respond, a red decimal point appears on the (right) negative side of the display transmitting means 20 following the number of negative responses indicated. This indicates that the negative response was the correct response.

An interactive transmitting means 20 is connected to the remote input means 22. The transmitting means 20 preferably comprises a large viewing device enabling the students 14 in the classroom to view transmitted information. Suitable viewing devices include a large wall screen computer data display device, a CRT monitor, overhead projector etc. The transmitting means 20 preferably displays data such as the number of affirmative responses, the number of negative responses, affirmative confirmation indication, negative confirmation indication, total responses indication and a correct responses indication. The transmitting means 20 is divided into sections, namely a right and left section. Preferably, one section of the transmitting means 20 is associated with affirmative responses while the other is associated with negative responses.

In use, when an instructor poses a question to the students 14 either orally or visually, the students are permitted time for cogitation and subsequently register their answers via the response means 18 which register in the controller means 16 previously described herein.

The instructor 10 is then free to indicate the correct response by use of the appropriate key of the remote input means 22. Since the input means 22 is preferably in radio communication with the controller means 16, upon activation of the input means 22, the student body responding consensus is displayed accordingly. The individual student affirmative responses are totalled and displayed in the left section of the transmitting means 20 and the individual student negative responses are totalled and displayed in the right section of the transmitting means 20. In addition, the transmitting means 20 will preferably display the affirmative and negative totals in appropriate colour e.g. green for the total of affirmative responses, red for the total of negative responses. In this arrangement, the answers of an individual student are not vocalized amongst the other members of the class 14 and thus, the embarrassment associated with an incorrect response is avoided. This feature has advantages in that individual students can instantly recognize his or her success with respect to the class consensus as displayed, while the marks accrued by each student having response means 18 are computed by the controller means 16 in accordance with the teacher's scoring and bonus schemes previously entered in the controller means 16 and such marks, for each student, are credited and stored in the controller means for ultimate use in the computing of records and reports. Having visually tabulated the number of affirmative and negative responses, the correct response is simultaneously indicated by a cursor e.g. a decimal point in the appropriate colour and section of the transmitting means 20, which cursor is located immediately after the number in the appropriate section. This system allows for instant learning and consensus feedback for each individual student in the class which has positive pleasure motivation and subsequent learning concentration benefits. Simultaneously, the teacher is provided with valid marks and scores for each student since student responses are irrevocable once made.

Further, an auxiliary feedback device 24 may be included with the system in the form of an audio system suitably linked to the input means 22. The audio system 24 functions to produce a certain frequency in the event of an affirmative response by the students being required to be correct or alternatively, a different frequency in the event a negative response is required by the students, to be correct. The tones may be elicited from both affirmative and negative response requirements to indicate that one or the other is the correct response. Further still, the audio system may be used to indicate whether a majority of students correctly answered affirmatively or correctly answered negatively. Still further, the audio system, by means of a third frequency, may be used by the teacher to inform students that the period in which they must respond has begun and is automatically generated by the teacher when key 22A or key 22B of the input means 22 is pressed. Other frequencies and combinations are possible, depending upon an instructor's requirements.

The use of the audio system 24, in combination with the visual system, is particularly effective for younger children as well as adolescents since it transforms the dull routine of drill testing into an exciting game. Further, the audio system is essential for providing students with complete "when to respond" and feedback information for fast-moving drills where students respond to questions provided on printed sheets rather than the transmitting means 20 and have no time to move their eyes from the printed sheets on their desks to the visual feedback screen at the front of the room and back again.

The hold key of the remote input means 22 is useful for vote-discussion-vote type opinion questioning. In this situation, the students may be asked an opinion or evaluative question requiring a vote. Students vote with their response means 18 and tabulation of responses is held by activating the hold key 22D of input means 22. The instructor may wish to discuss the question and call a second vote. This system allows students to develop reasoning and argument skills during the course of the discussion and gives them an opportunity to amend their answers if a particularly cogent point has been raised.

Because both pre-discussion and post discussion vote results are displayed to the class, students can determine if their discussion input influenced anyone, allowing them to gauge the effectiveness of their reasoning and argument and to fine-hone those skills accordingly. Further, since marks are awarded only to students voting with the majority, teachers are assured of thoughtful, conscientious evaluative voting on the part of students.

In the event that marks need to be cancelled, the cancel key 22C may be activated by the instructor.

In addition to the visual and audio ancillary equipment for use with the present system and the use of the computer program to run a lesson completely in automatic (as described elsewhere herein), the instructor has recourse to another means for automating a lesson. The instructor may incorporate a tape playing device having prescribed questions for the lesson. For complete automation, a dual frequency triggering tape device may be used (not shown), such as those known in the art. In this arrangement, the triggering tape device is used to activate the appropriate keys of the input means 22, thus leaving the instructor 10 free to pursue other tasks during the question period.

In use, the instructor 10 establishes a number of files in the CPU corresponding to the number of classes for which he or she is responsible. Each file preferably has subfiles associated therewith for teacher subject, class and other term data all of which may be readily modified for additions or deletions. Various modifications may be made to the files such as class changes etc. Further subfiles within the subfiles will preferably be established, which allocate memory to each student file for each individual student within each class. Such information may be, for example, response time to questions, marks earned or lost for question periods throughout the term, number of correct and incorrect affirmative responses versus correct and incorrect negative responses, standing relative to the other members of the class, relative improvement, attendance, etc. All of this information, once the proper files are established, is compiled automatically within the files by the action of the response means which is connected with the CPU. In this arrangement, the instructor need not continuously input data for each student, but is only required to use the keyboard of the CPU to access selected information or change information in the form of additions, deletions, etc.

The instructor may create further files for different mark allotment schemes, referred to by the Applicant as feedback options. Once such options are selected and imputed, there is no need to bother with them again unless the instructor wishes to modify them. Such feedback options include various scoring options, panel bonus options, addition of visual and/or audio stimuli herein previously described.

The scoring options may include option marks which permit an instructor to assign marks to select students for giving the best answer to opinion questions. Such a scoring scheme allows discussion and argumentation amongst the students and the decision of the students who receive marks rests with the student body. The determining factor is the majority vote. Those voting with the majority earn marks; those who do not, earn no marks.

A class bonus marking system provides additional bonus marks to be earned by class members whose final mark for a class session exceeds that of the class average. Applicant has found that this procedure is useful for inciting competition into the responding process. This discourages class members from helping each other in making responding decisions. The better students will be careful to offer no help to anyone, either inadvertently or otherwise, since if this were done, the class average would steadily increase and, the chances of earning a bonus would decrease. The amount of an individual student's bonus may be set to vary with the amount by which a student's score exceeds the class average.

Figure 3:
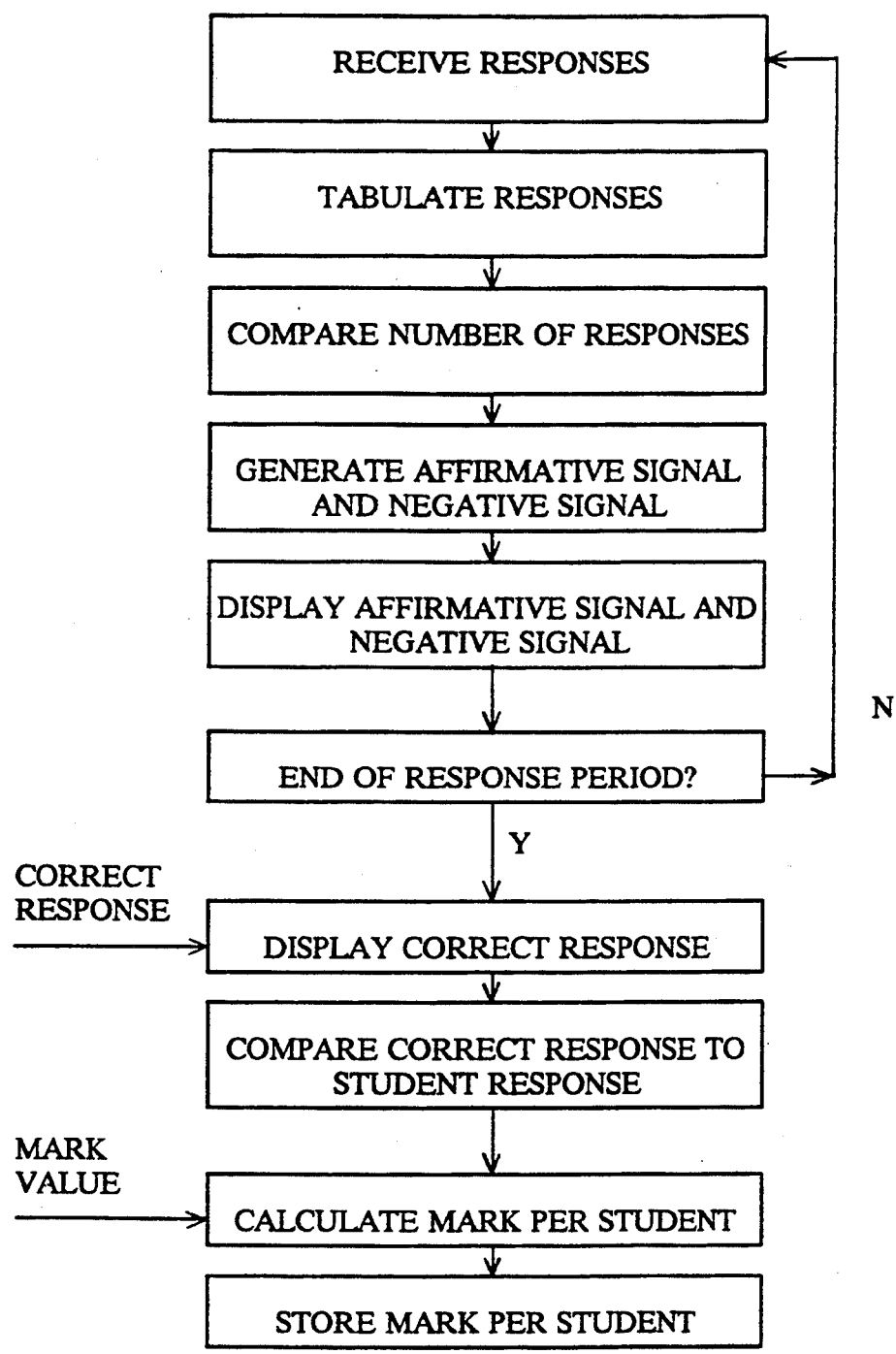
FIG. 3 is a flowchart of the computer program of the invention of FIG. 1.

In further explanation of the system and method of the present invention (as shown in FIGS. 2 and 3), having regard to the above description, the following will demonstrate the applicability of the invention to a teaching system for students. In this description, members of the class were each provided with a response means 18 in the form of a single button responder to reply to questions posed by the instructor. Thus, information questions of a true-false variety, or opinion questions, are posed to the class with an individual student wishing to respond affirmatively, pressing the single button of his or her responder. When a student responds affirmatively, this means that the student individually is responding "yes" or "true" or "agreed" to a question posed by the instructor, but if a student wishes to respond negatively, that is to provide a "no" or "false" or "disagree" answer, the button will not be pressed.

When the system is at rest, the transmitter means 20 displays two zeros. If the class is questioned "do 2 and 2 make 4?", the instructor presses the input means 22A, the green affirmative key, because any student response, to be correct, mandates an affirmative answer requirement. At the instructor's press of 22A, the zeros disappear leaving a blank display on the transmitting means 20 and simultaneously the class hears a time-to-respond beep.

The blank display and the beep both warn students that the responding time has begun. Students may respond affirmatively by pressing their single button response means 18 at any time while the display is blank. Students wishing to respond affirmatively press their single button response means 18. Students wishing to respond negatively, will not press their buttons. Having allowed time for cogitating and responding, the instructor releases the green affirmative key 22A of the input means 22 to see how the class responded. Alternatively, the instructor may pose a question, then permit time for cogitation, or for working out answers on paper, or for discussion, and only then press and immediately release the affirmative key 22A to begin a two-second responding period with the "respond now" tone and the blank display. Instantly, the transmitting means 20 displays to the instructor and the entire class, the number of students who responded affirmatively in the left section of the display and also the number of students who responded negatively in the right section of the display. A decimal point flashes after the number in the left affirmative section to indicate that the correct response was an affirmative one.

The numbers remain displayed for a pre-set amount of time and then the two zeros reappear. Simultaneously, marks earned by individual students in accordance with the instructor's pre-set scoring scheme are computed by the controller means 16, distributed to the appropriate files, stored and ultimately manipulated for the automatic production of a variety of essential and useful records and student reports.

Simultaneously with the numbers appearing on the display of the transmitting means 20, the class hears two short beeps. The first is a very high frequency beep signalling that the correct response was an affirmative one, a verification of the flashing decimal point on the left affirmative side. The second beep will be a similar high frequency beep if the two numbers indicate that the majority of students (correctly) responded affirmatively. It will be a low frequency beep if the majority of students (incorrectly) voted negatively.

If the class is questioned "do 2 and 2 make 7?", the instructor simultaneously presses and holds down input means 22B, the red negative key, because any student response to be correct must be a negative one. At the instructor's press of 22B, the zeros disappear leaving a blank display on the transmitting means 20 and simultaneously the class hears a time-to-respond beep.

The blank display and the beep both warn students that the responding time has begun. Students may respond affirmatively by pressing their single button response means 18 at any time while the display is blank.

Students wishing to respond affirmatively press their single button response means 18. Students wishing to respond negatively, will not press their buttons. Having allowed time for cogitating and responding, the instructor releases the red negative key 22B of the input means 22. Or, the instructor may use the alternative method referred to above where the instructor will press and immediately release key 22B of the input means 22, but only after time for consideration has taken place.

Instantly, the transmitting means 20 displays the number of students who responded affirmatively in the left section of the display and also the number of students who responded negatively in the right section of the display. A decimal point flashes after the number in the right negative section to indicate that the correct response was a negative one.

The numbers remain displayed for a pre-set amount of time and then the two zeros reappear. Simultaneously, marks earned by individual students in accordance with the instructor's pre-set scoring scheme are computed by the controller means 16, distributed to the appropriate files, stored and ultimately manipulated for the automatic production of a variety of essential and useful records and student reports.

Simultaneously with the numbers appearing on the display, the class hears two short beeps. The first is a very low frequency beep signalling that the correct response was a negative one, which is a verification of the flashing decimal point on the right negative side. The second beep will be a similar low frequency beep if the two numbers displayed indicate that the majority of students (correctly) responded negatively. It will be a high frequency beep if the majority of students (incorrectly) voted affirmatively. Following the feedback to a negative question, the instructor always tells the class why the correct response was negative and what is the correct answer.

From such a system, the visual feedback to the class members and instructor tells them how many responded to the question and in which category the class members answered—i.e. the affirmative or negative, as well as indicating by the flashing symbol, which was the correct response and therefore whether the majority responded correctly. The simultaneous audio feedback confirms whether the correct response was an affirmative or negative one and whether the majority responded correctly.

Use of the system provides an added strong pleasure motivation as would be encountered in the case of e.g. game motivation for the class members or students. With the audio and visual feedback, an enhanced learning environment can exist. Thus, this will achieve increased learning and learning skills.

As discussed above, the techniques described herein can be used for other than providing direct affirmative answers or negative answers. The system of this invention can also be used for e.g. a vote-discussion-vote technique for opinion questioning.

In this instance, the instructor may pose a question e.g. "Would you agree that Lee was a greater General than Grant?" Simultaneously, the instructor presses and holds down the blue opinion key 22D of the input means 22. Immediately, the two zeros displayed on the transmitting means 20 are replaced by two decimal points but no numbers and the class hears the start-to-respond beep. Students press their buttons to indicate an affirmative response i.e. a vote for Lee, while others will not press their buttons indicating a negative response i.e. a vote for Grant. After allowing time for cogitation and responding, the instructor releases the blue opinion key 22D. The two decimal points remain displayed on the transmitting means 20.

After discussion among the class members, if permissible, the question is posed a second time. Again, the instructor presses the blue opinion key 22D but this time will do so once, twice or three times quickly, before holding it down. How many times the blue opinion key will be depressed before it is held down will depend on how many marks the instructor has decided to award to those students whose responses on the second vote will earn them the marks (allotted only to those students voting with the majority) and in accordance with the pre-set marking scheme.

In turn, what marks will be earned will be determined by the instructor taking into account the importance or difficulty of the issue being discussed and the intensity of the discussion. If the pre-set marks are 3, 6 and 9, and a very heated, important issue discussion has taken place, the instructor will depress the 22D key three times before holding it down and majority students will each earn 9 points. If it is an unimportant issue, the blue opinion key 22D will be depressed only once and held down and majority students will earn only 3 marks each. Anything in between will mean the 22D key will be depressed twice and held down earning the majority students 6 marks each.

If the Lee versus Grant issued provides a heated discussion, the instructor may depress the blue opinion key 22D three times and hold it down. Immediately, the class hears the time to respond beep, the instructor allows time for cogitation and responding and then releases the blue opinion key 22D.

This time, two numbers will appear on the display panel, replacing the decimal points, the number on the left indicating affirmative responses on the first vote, the number on the right indicating affirmative responses on the second vote. The first number to appear e.g. number 3 (assume a small class of just seven students) indicates that three students responded affirmatively on the first response, voting for Lee.

Conversely and, although not shown, obviously on that first vote a majority of four students voted for Grant. The second number to appear e.g. number 4, indicates that following the discussion, the majority vote changed i.e. four students, representing the majority, responded affirmatively, voting for Lee. This indicates that the discussion persuaded one student to change his or her mind.

There is no audio feedback for opinion questioning. Additionally, since majority voting requires that there always be an odd number of participants, where the class comprises an even number of students, the instructor also plays the part of a student.

Marks for opinion questions are awarded to those class members who vote with the majority on the second vote. In the instance case, the instructor having depressed the blue opinion key 22D three times and the pre-set marking scheme having been 3, 6 and 9, each student who voted with the majority i.e. for Lee, will earn 9 marks.

If time is not available for discussion among class members, the instructor, after posing the question, simply depresses the blue opinion key 22D four times in quick succession before holding it down. Following the student responses and the release of the blue opinion key 22D by the instructor, the number of affirmative votes will appear on the left affirmative side of the display panel and the number of negative votes will appear on the right negative side of the display panel. When no discussion is involved, majority students earn the minimum marks in accordance with the scoring scheme.

The question, "Was Lee a greater general than Grant" can be either an opinion question or a straightforward information question. In the former case, the instructor will be certain that the students understand clearly that what he/she is looking for are the opinions of the students themselves and not his/her own. The instructor will then treat the question in the manner described in the above scenario with the majority students earning the marks in accordance with the pre-set opinion scoring scheme.

But assuming that the instructor has taught the class members that i.e. Lee was indeed a greater General than Grant, and this is the response-sought by the instructor, the instructor would simply pose the question and press the green affirmative key 22A. The students who responded "yes" would earn the marks in accordance with the pre-set information marks scoring scheme, even though the majority may have responded "no".

For very simple opinion questions and as an alternative to the above, the instruction may pose the opinion question, permit time for cogitation, even for a short discussion and then press the affirmative key 22A or the negative key 22B, depending on the position which the instructor supports. Following the responding and feedback, those students who voted with the majority will earn the marks whether the majority agreed with the instructor or not. If the majority disagreed, the instructor will always provide the reason(s) he or she took the opposition position.

An instructor has the option of choosing whether or not he/she wishes to award marks for an opinion question. Assuming the instructor does not wish to award marks, the yellow key 22C is depressed cancelling the marks earned on this question only. This method of pressing the yellow key also enables the instructor to correct an error i.e. if a green key was inadvertently pressed instead of a red key, or vice-versa, the same question is posed and the proper key pressed, allowing the instructor to re-enter the correct answer.

Once student response marks are recorded by the Program, there is no way to erase them. They will be automatically transferred to the files of the individual students and ultimately to the term reports.

In further explanation of the system and method of the present invention, having regard to the above description, the following will demonstrate the applicability of a totally-automated version of the present invention to a teaching system for students which requires only one computer per classroom and not a single classroom teacher. It can be operated solely by department heads and the assignment of an adult monitor to each class. In this description, department heads of this school having upgraded their respective libraries of coded subject matter by examining the question response analysis results of the previous term, then proceed to select the items for their current term's classes from the upgraded libraries of items, add or modify items as desired and finally, to organize the items into computer screen lessons.

The assigned classroom monitors enter in the computer, the class information and student names for their respective classes, at the beginning of the term and operate the lessons as scheduled by the department heads. The computer screens are projected onto the classroom wall screen and, like the transmitting means 20, display, is visible to all class members. In this description, all class members have a responding button and are required to self-score themselves simultaneously with pencil and paper. All lessons will be run on automatic at the speeds and with other operating options prescribed by the department heads and set in advance by the classroom monitors who otherwise, will have no need or right to interfere with the running of the lessons as prescribed.

All through the term and the daily running of the lessons, the classroom monitors will log the daily "percentage of correct student responses" and will print out daily lesson records, weekly interim student reports, scoreboards and such other records and reports or materials as may be requested such as remedial and enrichment lessons, possibly using a different set of DP's than those employed during the regular class sessions. Department heads will examine the records and reports and assign remedial or enrichment lessons where warranted. The daily log and "percentage correct" figures will help them decide if any changes in the manner in which the lessons are being run are required.

At the end of the term, the regular written final examinations will be given—or will not be given—depending on what the administration finds to be most appropriate for a particular grade level. The final standing of individual students and the decision to advance them to the next grade, may be based solely on their daily responding marks only, or upon their final written examination only, or upon a combination of both.

Just prior to printing the final student term reports, department heads will determine and enter all final term report options. These will include integrating the average of daily responding marks with some or all of possible self-score averages, written examination marks, consideration for effort or improvement marks, target and other bonus marks or penalties and possibly adding individual or class messages for parents. The final student term reports will then be printed out by the classroom monitors and distributed to students, parents and administration.

The individual student reports may be as simple or as comprehensive as desired and could even include the results of every daily lesson taken by the student. For disgruntled students or parents, the daily lesson records are always available to prove exactly how the student responded to every question that was asked during the term. Every report provides an exact standing of that student in relation to the class average. With the class average stated by the number 1, any number larger or smaller than 1, rates that student accordingly.

Finally, department heads, guided by the responses, analyze the record of each of the individual questions posed during the term, upgrade and update the contents of the lessons accordingly and make such other adjustments as are deemed warranted, ready for the next term.

This system and method of teaching students avoids or overcomes the general problems which are the result of the constraints of mass education and has many advantages concerning addressing and resolving the specific problems of administrators including:

permitting administrators to purchase a teaching system that requires only a single computer and program operating in conjunction with an Interactive-Responder (the name given to the input, respond and transmittal peripheral equipment employed by the system as described above) and the appropriate courseware for the term to teach any academic subject at any level to an entire class, which is highly affordable;

permitting administrators to ignore the problem of determining maximum student learning potentials for particular subjects by simply implementing a teaching system so superior to conventional teaching and so extremely efficient that it virtually guarantees that all students will learn and perform at, or close to, their potential;

permitting administrators to enable teachers to teach larger classes with no more difficulty than teaching smaller classes because of their ability to get 100% interaction from all students in the class and thereby offsetting the adverse effects of diverse abilities and tracking caused by current overcrowded classrooms;

permitting administrators to put a practical "teacher accountability" program in place that will both discourage and detect poor or irresponsible teaching;

permitting administrators to implement a system of efficient teaching that can be utilized by teachers to enhance their present efforts or that teachers can utilize as a complete substitute for their present systems, thus guaranteeing the maximum learning for all students regardless of the abilities or mind sets of individual teachers;

permitting administrators a means for instituting automatic absentee-teacher lessons which will be as effective and efficient as those provided by the regular teachers;

permitting administrators to improve the general reading skills and speed of all students by putting in place a system of teaching based on computer screen lessons which are print-oriented and which stress speed reading with comprehension;

permitting administrators to upgrade the status of its teachers by allowing them to become more professional as "facilitators" and researchers rather than primarily as lecturers and monitors; and permitting administrators to encourage and obtain more educational funding from all possible sources by being able to prove more efficient teaching and superior results.

Furthermore, many advantages occur with respect to addressing and resolving the specific problems of teachers and students, including:

permitting teachers to initiate and perpetuate 100% student interaction with all their students by requiring and making it possible for all students in the class to respond to every question they pose;

permitting teachers to question and to provide all their students with learning and game feedback instantaneously after all student responses, with no loss of teaching time and at high rates of sped, thereby initiating and continually generating a sufficient intensity and duration of motivation and concentration for every question posed, achieving the highest possible number of learning cycles for every student, and thus guaranteeing all their students maximum learning in accordance with their individual potentials;

permitting teachers to significantly increase the rate at which questions can be asked and responses made and confirmed or corrected, in order to speed up the learning process generally, thus providing adequate class time for discussion, comprehension and application lessons and avoiding any undue pressures in properly completing the curriculum requirements;

permitting teachers to provide motivation for rote-drilling where, in conventional teaching, doing so is extremely difficult and to make it unnecessary for them to resort to time-consuming counter-productive purely motivational teaching efforts;

permitting teachers to end or very much reduce the problems of discipline and dropouts by keeping all students continually occupied responding to question, or preparing to respond to question, and guaranteeing that all students will be able to take full advantage of every learning cycle;

permitting teachers to gauge the effectiveness of their teaching as they proceed through their lessons and pose questions so that they may know when their students are having learning difficulties and be able to take the appropriate remedial measures;

permitting teachers to quickly gauge on a daily, weekly or any regular basis, whether their classes are generally progressing, remaining static or dropping behind so that they may apply appropriate and timely remedial measures if necessary to be certain the curriculum requirements will be fully and properly covered;

permitting teachers to compare daily test records of all students in the class in order to quickly gauge on a daily, weekly or any regular basis, whether any students are falling sufficiently behind in their studies to require that immediate remedial measures be taken to prevent a dropout syndrome from developing;

permitting teachers to test all their students daily as part of the normal teaching routine, eliminating entirely the need to ever again make give or mark periodic tests and thus ending the need or desire of their students to cheat or to cram for periodic tests or to take any tests where the essential instantaneous learning feedback is withheld causing incorrect student responses to be reinforced;

permitting teachers to effectively compete for their students' study and homework time against commercial entertainment and recreation activities by enabling them to teach lessons that generate the same powerful game pleasure motivation enhanced by "bells and whistles" that attract students to commercial activities;

permitting teachers to implement small group cooperative learning by enabling teachers to control the learning activities of small groups of students so that all members of the group get an equal opportunity to participate in the group activities, and without the presence of teachers;

permitting teachers to implement instant secret-ballot voting that eliminates the risk of intimidation when their students are called upon to resolve academic issues or any other kinds of issues by a class vote;

permitting teachers the viability of utilizing the Interactive-Responder only, for orientation and training or using the system for spontaneous teaching that does not require the use of computer courseware, or using the full system with courseware, either manually or in a fully-automated mode.

It will be understood that the present method and system for learning provides for diverse classroom teaching possibilities and scoring options all of which may or may not include audio and/or visual stimuli to further fortify the learning process.

Although specific embodiments of the present invention have been described above, it is not limited thereto and it will be apparent to those skilled in the art that numerous modifications form part of the present invention insofar as they do not depart from the spirit, nature and scope for the claimed and described invention.

I claim:

1. A teaching system for improving the ability of a plurality of students to learn and for automatically managing marks and records of the plurality of students to evaluate the performances thereof, said apparatus comprising a plurality of student remote response units, each of said student response units comprising a single button for generating a positive response and a negative response, a computer in communication with said plurality of student response units, said computer having a plurality of subfiles comprising at least one corresponding subfile for each of said plurality of students, and capable of compiling responses from said plurality of student response units, generating an affirmative signal corresponding to the number of positive responses received and a negative signal corresponding to the number of negative responses received and storing a mark for each of said plurality of students in said corresponding subfiles, an instructor input unit in communication with the computer, said instructor input unit comprising an affirmative key for initiating an affirmative response period, a negative key for initiating a negative response period, an opinion key for initiating a first opinion period, for selecting a mark value and for initiating a second opinion period, a classroom viewing device in communication with the computer and remotely operated by said instructor input unit, said viewing device comprising an affirmative section responsive to said affirmative signal for displaying a visual signal corresponding thereto and responsive to said affirmative key for indicating affirmative as being correct, and a negative section responsive to said negative signal for displaying a visual signal corresponding thereto and responsive to said negative key for indicating negative as being correct, and an audio system in communication with the computer, said audio system adapted to generate a first audio signal at the beginning of the response periods and responsive to said computer for generating a second audio signal indicating a majority of responses received as being correct or incorrect and for generating a third audio signal for indicating whether affirmative or negative is a correct responses, whereby an instructor successively poses objective type questions to said plurality of students while selectively pressing said affirmative key, negative key and opinion key establishing said affirmative response period and said negative response period, said first opinion period, said second opinion period and mark value.

2. A teaching system as claimed in claim 1 wherein said computer updates said affirmative and negative signals as said responses are received.

3. A teaching system as claimed in claim 1 wherein said instructor input unit further comprises a cancel key for cancelling the storing of a mark.

4. A teaching system as claimed in claim 1 wherein said audio signals comprise a series of high frequency and low frequency tones.

5. A method for improving the ability of a plurality of students to learn and for automatically managing marks and records of the plurality of students to evaluate the performances thereof, said method comprising the steps of:

successively posing objective type questions to said plurality of students, each of whom is provided with a student remote response unit comprising a single button for generating a positive and a negative response, said plurality of student response units in communication with a computer, said computer having a plurality of subfiles comprising at least one corresponding subfile for each of said plurality of students, said computer capable of compiling responses from said plurality of student response units, generating an affirmative signal corresponding to the number of positive responses received and a negative signal corresponding to the number of negative responses received and storing a mark for each of said plurality of students in said corresponding subfiles, selectively initiating a series of affirmative response periods, or negative response periods or a series of first opinion periods, mark value selections and second opinion periods by using an instructor input unit in communication with said computer, said instructor input unit comprising an affirmative key for initiating the affirmative, response periods, a negative key for initiating the negative response periods, an opinion key for initiating the first opinion periods, for selecting the mark value and for initiating the second opinion periods, automatically tabulating the positive and negative responses made by the plurality of students and displaying a signal corresponding to the number of positive and negative responses received by the computer, selectively displaying on a classroom viewing device either an affirmative signal for indicating affirmative as being correct or a negative signal for indicating negative as being correct, said classroom viewing device in communication with the computer and remotely operated by said instructor input unit, said viewing device comprising an affirmative section responsive to said affirmative signal for displaying a visual signal corresponding thereto and responsive to said affirmative key for indicating affirmative as being correct, and a negative section responsive to said negative signal for displaying a visual signal corresponding thereto and responsive to said negative key for indicating negative as being correct, generating a first audio signal at the beginning of the response periods, a second audio signal for indicating a majority of responses as being correct or incorrect and a third audio signal for indicating whether affirmative or negative is a correct response, and automatically tabulating and storing within said computer mark values for each of said plurality of students.

6. A method as claimed in claim 5 wherein said computer updates said affirmative and negative signals as said responses are received.

7. A method as claimed in claim 5 wherein said instructor input unit further comprises a cancel key for cancelling storing of a mark.

8. A method of claim 5 wherein said audio signals comprise a series of high frequency and low frequency tones.

* * * * *